US005918767A

United States Patent [19]
McGill

[11] Patent Number: 5,918,767
[45] Date of Patent: Jul. 6, 1999

[54] DISPENSING APPARATUS

[75] Inventor: Shane Robert McGill, Rochester, United Kingdom

[73] Assignee: McGill Technology Limited, United Kingdom

[21] Appl. No.: 08/765,396

[22] PCT Filed: Jul. 3, 1995

[86] PCT No.: PCT/GB95/01557

§ 371 Date: Jan. 2, 1997

§ 102(e) Date: Jan. 2, 1997

[87] PCT Pub. No.: WO96/01224

PCT Pub. Date: Jan. 18, 1996

[30] Foreign Application Priority Data

Jul. 2, 1994 [GB] United Kingdom .................. 9413376
Apr. 7, 1995 [GB] United Kingdom .................. 9507242

[51] Int. Cl.⁶ .................................................. B65D 35/28
[52] U.S. Cl. .................. 222/95; 222/105; 222/181.1; 222/181.2; 222/181.3; 222/386
[58] Field of Search ................... 222/95, 105, 181.1, 222/181.2, 181.3, 386, 541.3, 541.4

[56] References Cited

U.S. PATENT DOCUMENTS

| Re. 32,379 | 3/1987 | Touzani .................................. 215/1 C |
| D. 268,840 | 5/1983 | Reed ........................................ D7/300 |
| D. 272,404 | 1/1984 | Angelakos ................................ D7/17 |
| D. 285,082 | 8/1986 | Verkler .................................... D15/82 |
| D. 307,754 | 5/1990 | Osrow et al. ............................ D15/82 |
| D. 364,175 | 11/1995 | Alpers et al. ........................... D15/82 |
| D. 365,496 | 12/1995 | McLinden et al. ...................... D7/379 |
| 1,663,677 | 3/1928 | Byerly ...................................... 222/95 |

(List continued on next page.)

FOREIGN PATENT DOCUMENTS

| 0448571 | 5/1948 | Canada .................................... 92/45 |
| 246052 | 11/1987 | European Pat. Off. ................ 222/95 |
| 0314209 | 5/1989 | European Pat. Off. ................... 9/28 |
| 89500092 | 9/1989 | European Pat. Off. .................. 92/44 |
| 406134 | 1/1991 | European Pat. Off. . |
| 1168470 | 1/1957 | France ..................................... 92/44 |
| 1219079 | 5/1960 | France ..................................... 92/44 |
| 8800013 | 1/1988 | France ..................................... 92/44 |
| 521761 | 3/1931 | Germany . |
| 3618634 | 12/1987 | Germany ............................... 222/105 |
| 0378615 | 2/1940 | Italy ......................................... 92/45 |
| 1649587 | 1/1989 | Japan . |
| 372974 | 12/1963 | Switzerland . |
| 653136 | 5/1951 | United Kingdom . |
| 1300386 | 12/1972 | United Kingdom .................... 92/44 |
| 2230057 | 10/1990 | United Kingdom .................... 92/44 |
| 2234556 | 2/1991 | United Kingdom .................... 92/44 |
| 8200456 | 2/1982 | WIPO .................................... 222/103 |
| 8703557 | 6/1987 | WIPO .................................... 222/103 |
| 8801054 | 12/1988 | WIPO .................................... 222/103 |
| 8905096 | 6/1989 | WIPO .................................... 222/103 |
| 9005697 | 5/1990 | WIPO ........................................ 5/62 |
| 9219389 | 11/1992 | WIPO . |
| 9413154 | 6/1994 | WIPO . |

OTHER PUBLICATIONS

Restaurant Equipment Dealer, 4/1960, p. 5, #462 Supreme Bowl, bottom right corner.

*Primary Examiner*—David J. Walczak
*Assistant Examiner*—Timothy L. Maust
*Attorney, Agent, or Firm*—Gifford, Krass, Groh, Sprinkle, Anderson & Citkowski, P.C.

[57] ABSTRACT

A dispensing apparatus for dispensing a single serving of a viscous or semi-solid product from a container, the container comprising a base, a deformable portion and an outlet, the apparatus comprising deforming means movable to engage and deform the deformable portion to discharge product from the container through the outlet, a seating for supporting the base of the container during dispensing of product from the container, an arm carrying the seating and movable between an operating position and a non-operating position in which the container may be removed from and placed in the seating, and support means for the arm whereby the arm is movable between said positions, the deforming means being engageable with the container only in the operating position.

18 Claims, 12 Drawing Sheets

U.S. PATENT DOCUMENTS

| | | | |
|---|---|---|---|
| 2,120,640 | 6/1938 | Craemer . | |
| 2,242,407 | 5/1941 | Tobey | 62/25a4 |
| 2,401,417 | 6/1946 | Engle . | |
| 2,408,704 | 10/1946 | Taylor | 222/160 |
| 2,558,887 | 7/1951 | Tesiero | 222/146.6 |
| 2,559,840 | 7/1951 | Arthur | 222/146.6 |
| 2,631,761 | 3/1953 | Gates | 222/390 |
| 2,752,068 | 6/1956 | Bryant | 222/529 |
| 2,889,949 | 6/1959 | Nirenberg | 214/310 |
| 3,081,920 | 3/1963 | Gorychka et al. | 222/509 |
| 3,104,031 | 9/1963 | Wagner | 222/390 X |
| 3,155,281 | 11/1964 | Stracey | 222/107 |
| 3,157,314 | 11/1964 | Nadler . | |
| 3,178,061 | 4/1965 | Giacalone | 222/146 |
| 3,250,433 | 5/1966 | Christine | 222/129 |
| 3,288,333 | 11/1966 | Valk, Jr. | 222/386.5 |
| 3,330,129 | 7/1967 | Halverson et al. | 222/145 |
| 3,349,973 | 10/1967 | Smith | 222/380 |
| 3,371,822 | 3/1968 | Galloway | 222/95 |
| 3,413,820 | 12/1968 | Paquin . | |
| 3,435,996 | 4/1969 | Jones | 222/386.5 |
| 3,677,443 | 7/1972 | Smadar | 222/94 |
| 3,826,409 | 7/1974 | Chilcoate | 222/107 |
| 4,022,031 | 5/1977 | Calim | 62/66 |
| 4,098,434 | 7/1978 | Uhlig | 222/94 |
| 4,155,304 | 5/1979 | Schweisser et al. | 101/366 |
| 4,163,802 | 8/1979 | Redfern et al. | 426/43 |
| 4,169,548 | 10/1979 | Bond | 222/505 |
| 4,213,545 | 7/1980 | Thompson et al. | 222/386.5 |
| 4,231,492 | 11/1980 | Rois | 222/1 |
| 4,293,082 | 10/1981 | Matsueda | 222/131 |
| 4,335,835 | 6/1982 | Beigler | 222/95 |
| 4,386,717 | 6/1983 | Koob | 222/94 |
| 4,420,948 | 12/1983 | Savage | 62/340 |
| 4,423,829 | 1/1984 | Katz | 222/95 |
| 4,452,823 | 6/1984 | Connolly | 426/115 |
| 4,458,830 | 7/1984 | Werding | 222/131 |
| 4,484,697 | 11/1984 | Fry, Jr. | 222/95 |
| 4,492,313 | 1/1985 | Touzani | 215/1 C |
| 4,506,988 | 3/1985 | Reed | 366/203 |
| 4,574,987 | 3/1986 | Halligan et al. | 222/107 |
| 4,651,538 | 3/1987 | Bull et al. | 62/398 |
| 4,660,740 | 4/1987 | Brandon, Jr. et al. | 222/1 |
| 4,711,373 | 12/1987 | Christine | 222/327 |
| 4,711,376 | 12/1987 | Manfroni | 222/146.1 |
| 4,722,457 | 2/1988 | Bedwell et al. | 222/103 |
| 4,723,688 | 2/1988 | Munoz | 222/88 |
| 4,753,371 | 6/1988 | Michielin et al. | 222/145 |
| 4,773,458 | 9/1988 | Touzani | 150/55 |
| 4,775,564 | 10/1988 | Shriver et al. | 428/35 |
| 4,796,784 | 1/1989 | Spirk et al. | 222/80 |
| 4,871,001 | 10/1989 | Nobuta et al. | 141/279 |
| 4,913,713 | 4/1990 | Bender | 62/3.61 |
| 4,921,135 | 5/1990 | Pleet | 222/82 |
| 4,921,147 | 5/1990 | Poirier | 222/527 |
| 4,938,386 | 7/1990 | Roethel et al. | 222/92 |
| 5,002,193 | 3/1991 | Touzani | 220/666 |
| 5,048,724 | 9/1991 | Thomas | 222/95 |
| 5,060,826 | 10/1991 | Coleman | 222/95 |
| 5,069,364 | 12/1991 | McGill | 222/95 |
| 5,071,034 | 12/1991 | Corbiere | 222/80 |
| 5,090,963 | 2/1992 | Gross et al. | 604/132 |
| 5,100,025 | 3/1992 | McGraw | 222/95 |
| 5,150,820 | 9/1992 | McGill | 222/95 |
| 5,188,261 | 2/1993 | Butters | 222/107 |
| 5,215,222 | 6/1993 | McGill | 222/95 |
| 5,232,027 | 8/1993 | Tanaka et al. | 141/270 |
| 5,265,764 | 11/1993 | Rowe et al. | 222/95 |
| 5,269,428 | 12/1993 | Gilbert | 215/100 |
| 5,305,924 | 4/1994 | Groover et al. | 222/129 |
| 5,333,761 | 8/1994 | Davis et al. | 222/212 |
| 5,361,941 | 11/1994 | Parekh et al. | 222/95 |
| 5,405,054 | 4/1995 | Thomas | 222/95 |
| 5,407,093 | 4/1995 | McGill | 220/666 |
| 5,421,484 | 6/1995 | Beach | 222/96 |
| 5,435,463 | 7/1995 | Hodgson | 222/105 |
| 5,463,878 | 11/1995 | Parekh et al. | 62/394 |
| 5,464,120 | 11/1995 | Alpers et al. | 222/1 |
| 5,492,249 | 2/1996 | Beach | 222/96 |
| 5,505,336 | 4/1996 | Montgomery et al. | 222/82 |

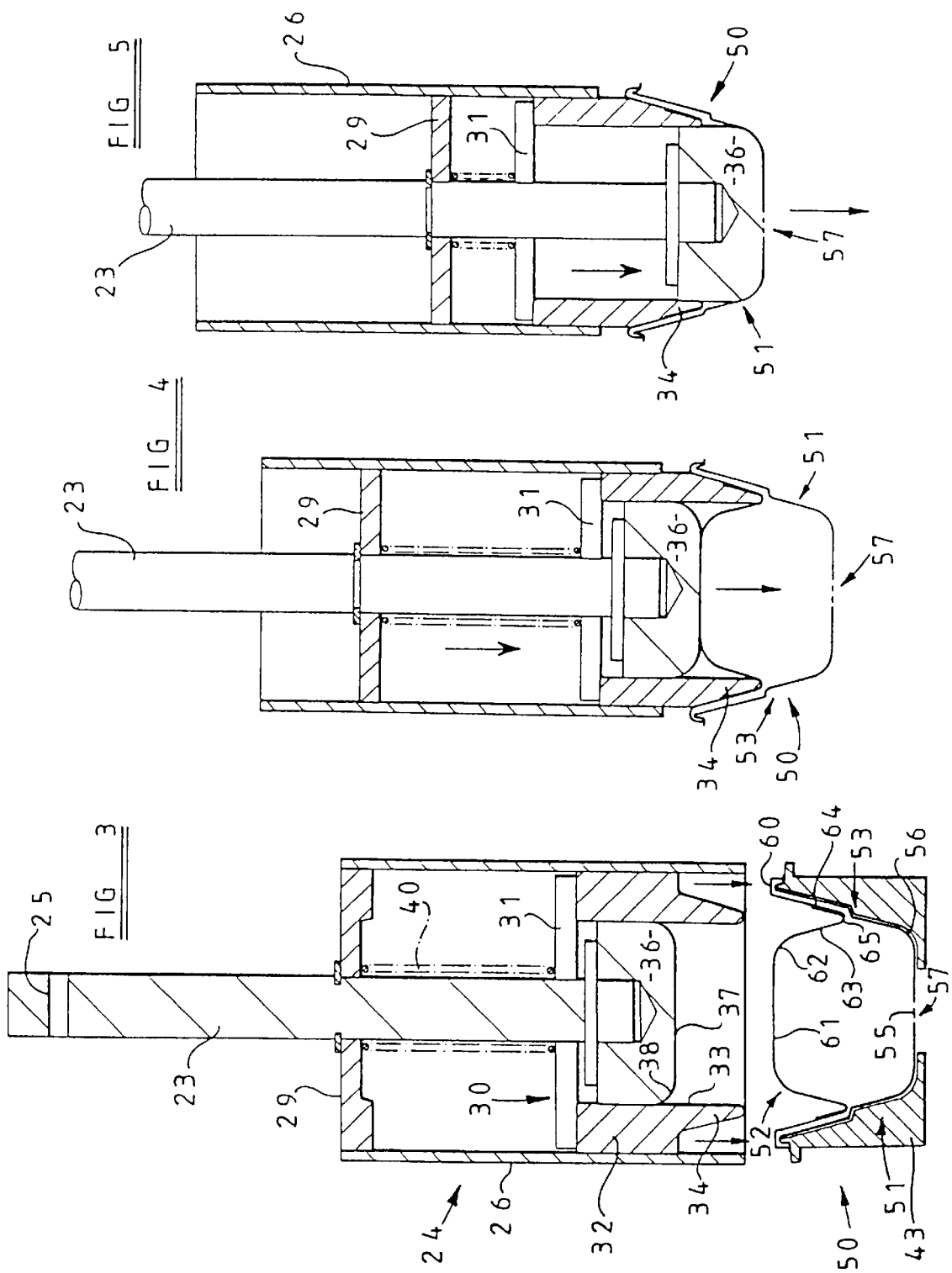

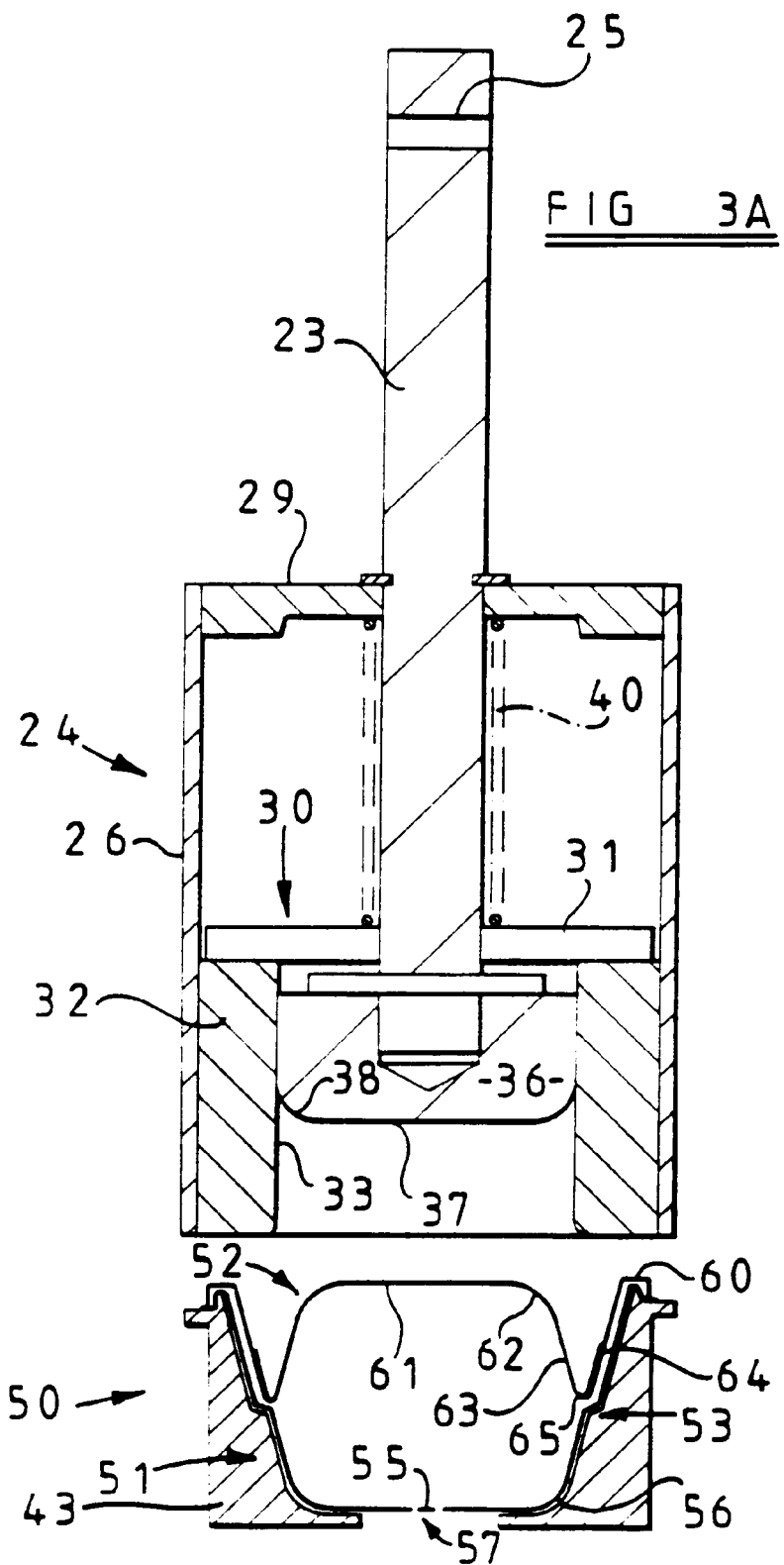

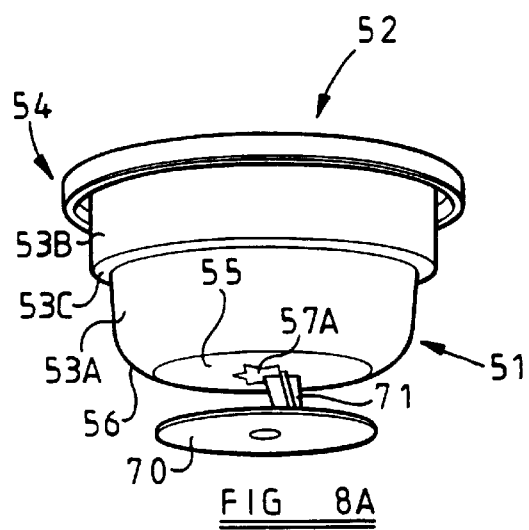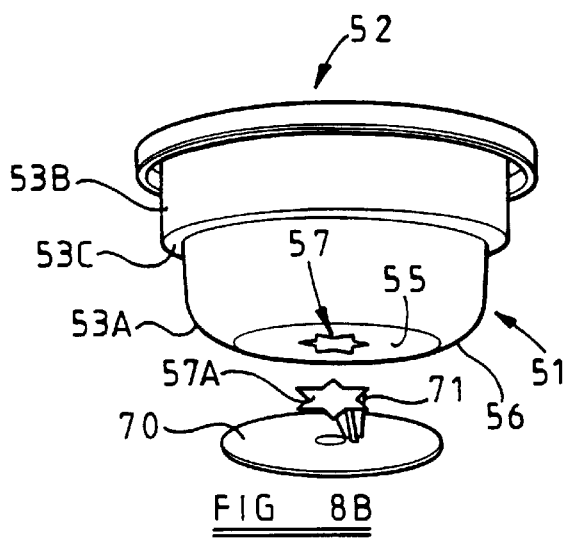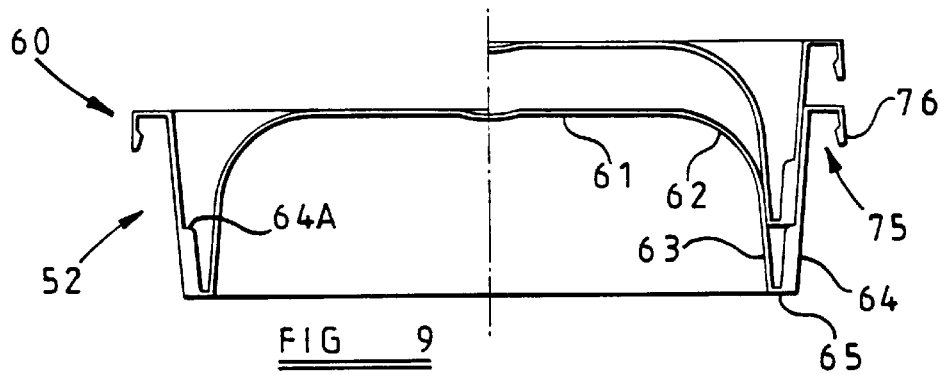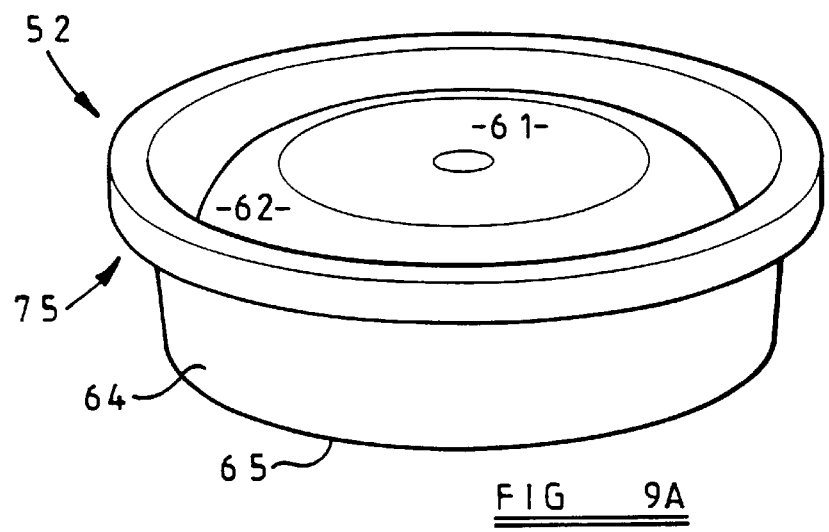

DISPENSING APPARATUS

This invention relates to dispensing apparatus for dispensing a viscous or semi-solid product from a container.

In dispensing food products hygiene requirements are becoming even stricter. Moreover convenience and variety of product are of greater importance.

An object of the invention is to provide a dispensing apparatus especially suitable for food products which is simple, adaptable and hygienic.

According to the invention there is provided, according to one aspect, a dispensing apparatus for dispensing a viscous or semi-solid product from a container comprising a base, a deformable portion and an outlet, the apparatus comprising deforming means movable to engage and deform the deformable portion to discharge product from the container through the outlet, a seating for supporting the base of the container during dispensing of product from the container, an arm carrying the seating and movable between an operating position and a non-operating position in which the container may be removed from and placed in the seating, and support means for the arm whereby the arm is movable between said positions, the deforming means being engageable with the container only in the operating position.

Preferably the deforming means is a plunger movable in a generally vertical direction, and the seating, in the operating position, is located vertically below the plunger, the arm and the seating being movable about a generally horizontal axis of the support means to a non-operating position to one side of the operating position.

Conveniently the seating and the arm are presented generally horizontally in the operating position and downwardly inclined to the horizontal in the non-operating position.

Preferably the seating and the arm are releasably securable in each of the operating and non-operating positions and the plunger is movable only when the seating is in the operating position.

The arm may be L-shaped and located in an inverted position, the shorter limb of the arm carrying the seating, and pivot means is located towards the lower end of the longer limb of the arm.

The arm may have a handle whereby the arm is movable manually between the operating and non-operating positions, and the seating is arranged for the container to be lifted up and out of the seating, the deformable portion of the container being presented upwardly towards the plunger and the outlet being presented downwardly from the arm when the container is located in the seating.

The apparatus may include an upright frame having towards its upper end a support for the deforming means and its associated drive means, the frame having intermediate its ends the arm and associated seating, and the frame having towards its lower end a base for supporting the frame, the base including a receiver spaced below the seating and giving access to a receptacle for product discharged from the container.

Conveniently the frame houses drive means for the deforming means and lighting means, and a housing surrounds the lighting means and has a light transmission region for lighting the housing from within.

The deforming means may be driven by a compressed gas operated piston and cylinder arrangement, and the apparatus includes a source of compressed gas and gas reservoir for supplying pressurised gas to the piston and cylinder.

Preferably the deforming means includes locating means movable to engage with the container to locate the container in the seating, and pressure generating means which engages with the deformable portion of the container to deform the portion towards the base in discharging product through the container outlet and the locating means and the pressure generating means are relatively movable so that, after the locating means has engaged the container, the pressure generating means moves relative to the locating means to discharge said product.

The locating means may comprise a locating member slidably mounted relative to the pressure generating means and resiliently urged by spring means towards a locating position, whereby after said member locates with the container the pressure generating means moves against the action of the spring means to deform the deformable portion of the container and the pressure generating means comprises a plunger head which is shaped to correspond with the internal shape of the base of the container. Alternatively the locating member may be powered towards a locating position independently of operation of the pressure generating means.

Conveniently the plunger head is generally cylindrical with curvilinear surfaces at its region which engages the deformable portion of the container.

In one arrangement the seating is a cup-shaped member arranged to receive a correspondingly-shaped base of the container, the seating having a central opening through which the container outlet is directed when the container is placed in the seating, the container being liftable out of the seating after a dispensing action, and the seating being removable from the arm. The seating member may be secured permanently on the arm.

According to another aspect of the invention dispensing apparatus for dispensing a viscous or semi-solid product from a container comprising a base, a deformable portion and an outlet, the apparatus comprising deforming means arranged to deform the container to discharge product from the container through the outlet, the deforming means including locating means movable to engage with the container to locate the container, and a plunger which engages with the deformable portion of the container to deform the portion towards the base in discharging product through said outlet, the locating means and the plunger being relatively movable so that, after the locating means has engaged the container, the plunger moves relative to the locating means to discharge said product.

According to a further aspect the invention provides dispensing apparatus for dispensing a viscous or semi-solid product from a container having a base, a deformable portion and an outlet, the apparatus comprising deforming means arranged to deform the deformable portion to discharge product from the container through the outlet, drive means for the deforming means, a seating for supporting the container, a frame on which the deforming means, the drive means and the seating are supported, the frame also housing a reservoir for compressed gas providing a source of compressed gas for operating the drive means.

The invention also provides a container for use with the dispensing apparatus comprising a base for receiving product to be dispensed, an outlet opening for discharge of product, a closure member or lid for closing the base after admitting product to the base, a deformable region of the closure member arranged to deform upon engagement by deforming means and to be moved towards the base to discharge product from the outlet, the closure member and the base each being nestable with other closure members and bases respectively when separate from one another, the base having upper and lower regions arranged so that when assembled the deformable region of the closure member extends into the upper region of the base and, upon deformation of the deformable region, the deformable region enters and moves to adjacent the internal surfaces of the lower region of the base, the base being of relatively rigid material compared with the deformable region.

Conveniently at the junction between the upper and lower regions of the base there is formed a shoulder, and the closure member extends towards its outer part to adjacent the shoulder, the closure member having inwardly of the outer part a domed region which, in use, is engaged and deformed by the deforming member towards the lower region of the base.

The outer region of the top part may include a turned over lip whereby the top portion is secured to the base part by the turned over lip engaging with the upper edge of the base part when the top part and the base part are assembled together after the base part is filled with product. Alternatively there are provided inter-engaging lugs or profiles on cooperating side walls of the lid part and the base part, or the outer edges of the lid and base are heat sealed together.

The container parts are conveniently formed of plastics by injection moulding, by thermoforming or by blow moulding or they may be of paper or cardboard which may be coated with plastic.

The dispensing apparatus may have a manually or power-operated drive means which causes the deforming means in the form of a plunger to be reciprocally movable towards and away from a container in a dispensing operation of the apparatus. The drive means may be electrically, hydraulically or gas operated.

Conveniently the arm is pivotable between a product discharge position and a container location position by pivoting through about 40–60° from a horizontal discharge position so that the support is presented to a better viewing position to the operative.

When the plunger is manually operated there may be provided a manually movable lever to which a shaft is attached for rotation therewith, and a linkage carried on the shaft is connected to a rod on one end of which is mounted the plunger.

Conveniently the plunger is movable along and guided by a cylinder arranged vertically and above a container locating position.

There may be provided a storage compartment for containers with, if required, refrigeration means for maintaining the containers at the desired dispensing temperature.

Conveniently the central deformable region is connected to the outer region through an integral flexible folded portion. The folded portion may have downwardly and upwardly directed folds one of which lies closely adjacent an inner surface of the base part when assembled therewith and the junction between the downward and upward folds preferably lying half way down the base part when assembled.

Preferably the central region includes a generally planar portion and the base part is of generally circular section.

Further features of the invention will appear from the following description of embodiments of the invention given by way of example only and with reference to the drawings, in which.

Figure 1:
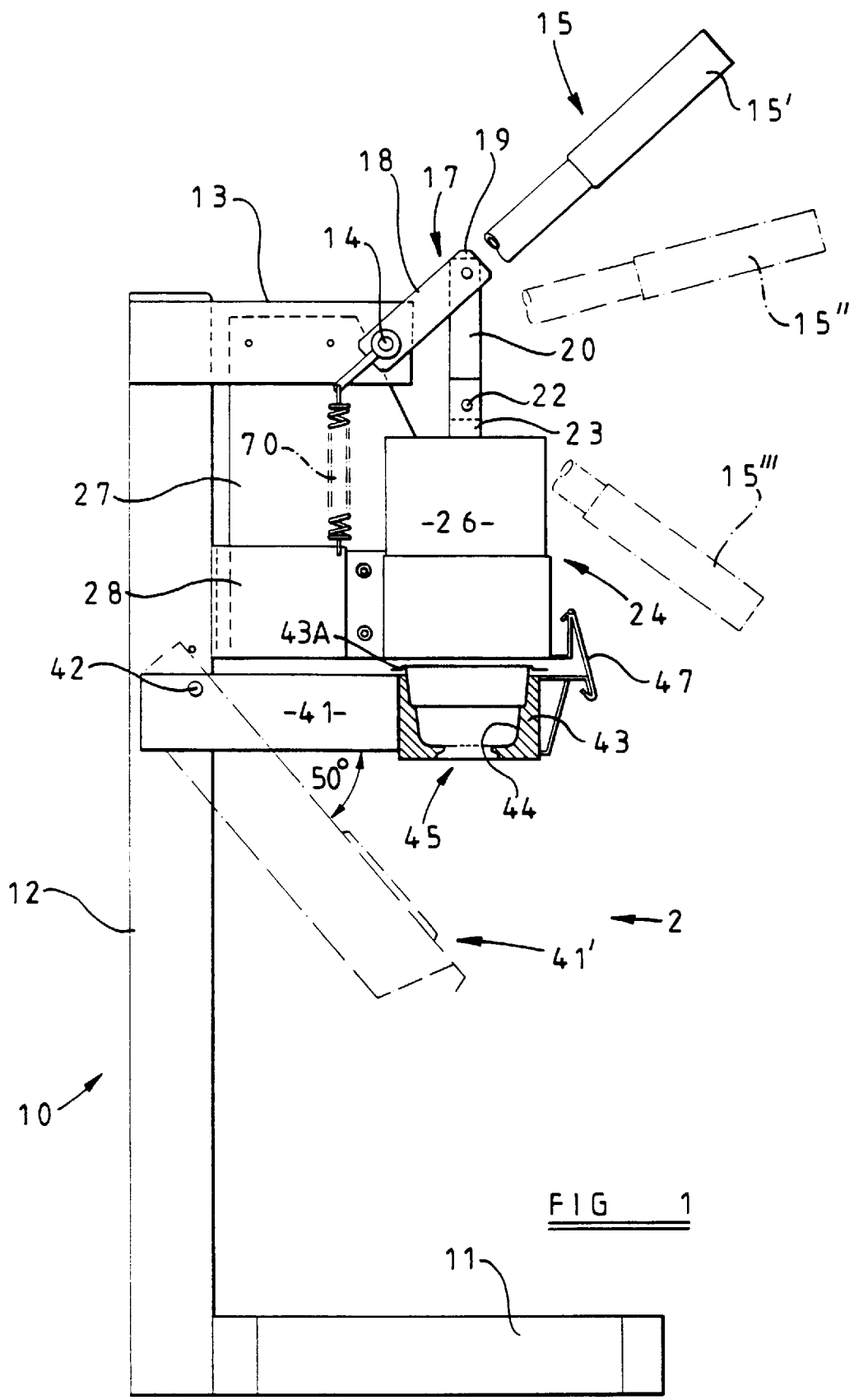
FIG. 1 is a side elevation of one embodiment of dispensing apparatus.
Figure 2:
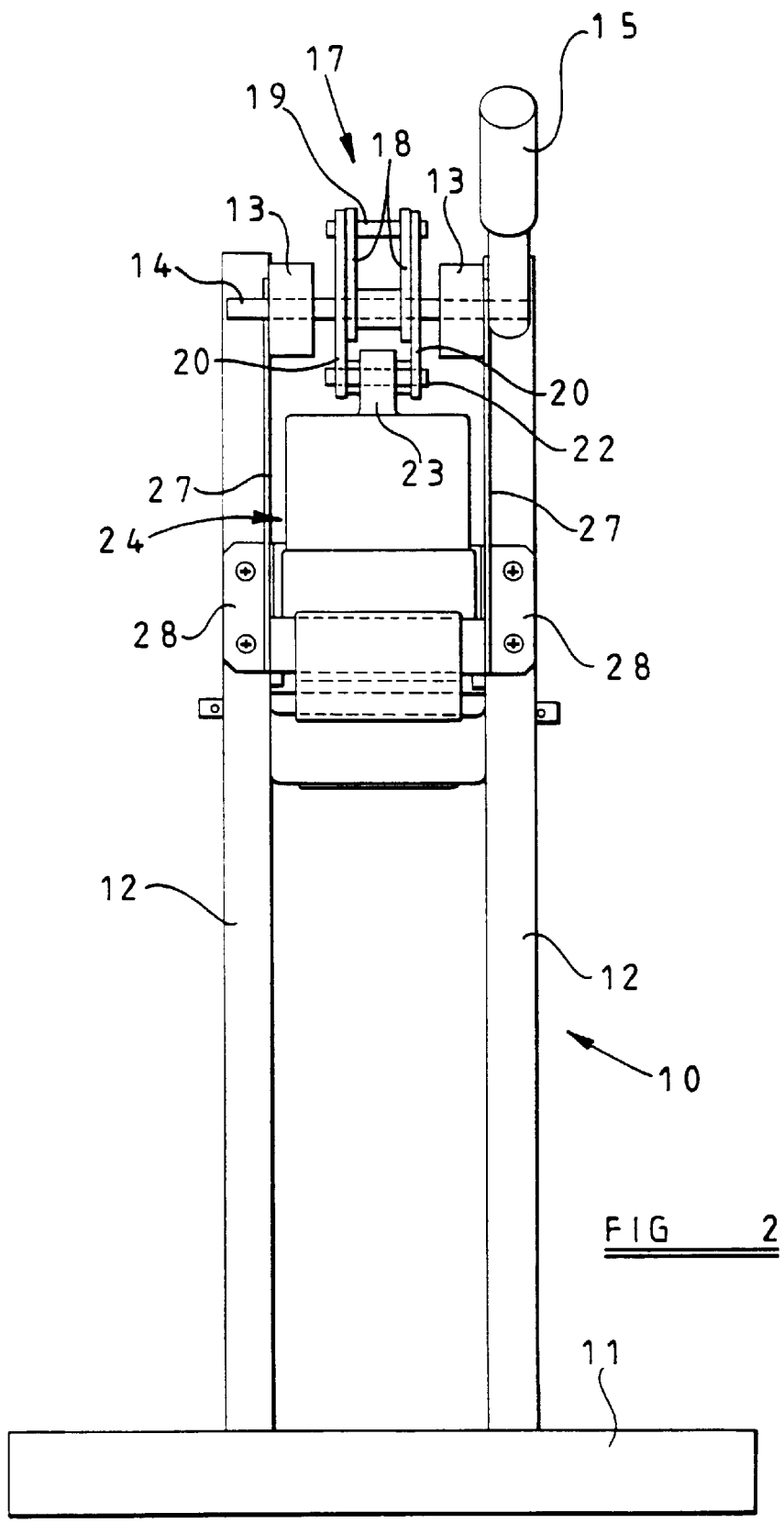
FIG. 2 is a view in the direction of arrow 2 in FIG. 1.
Figure 6:
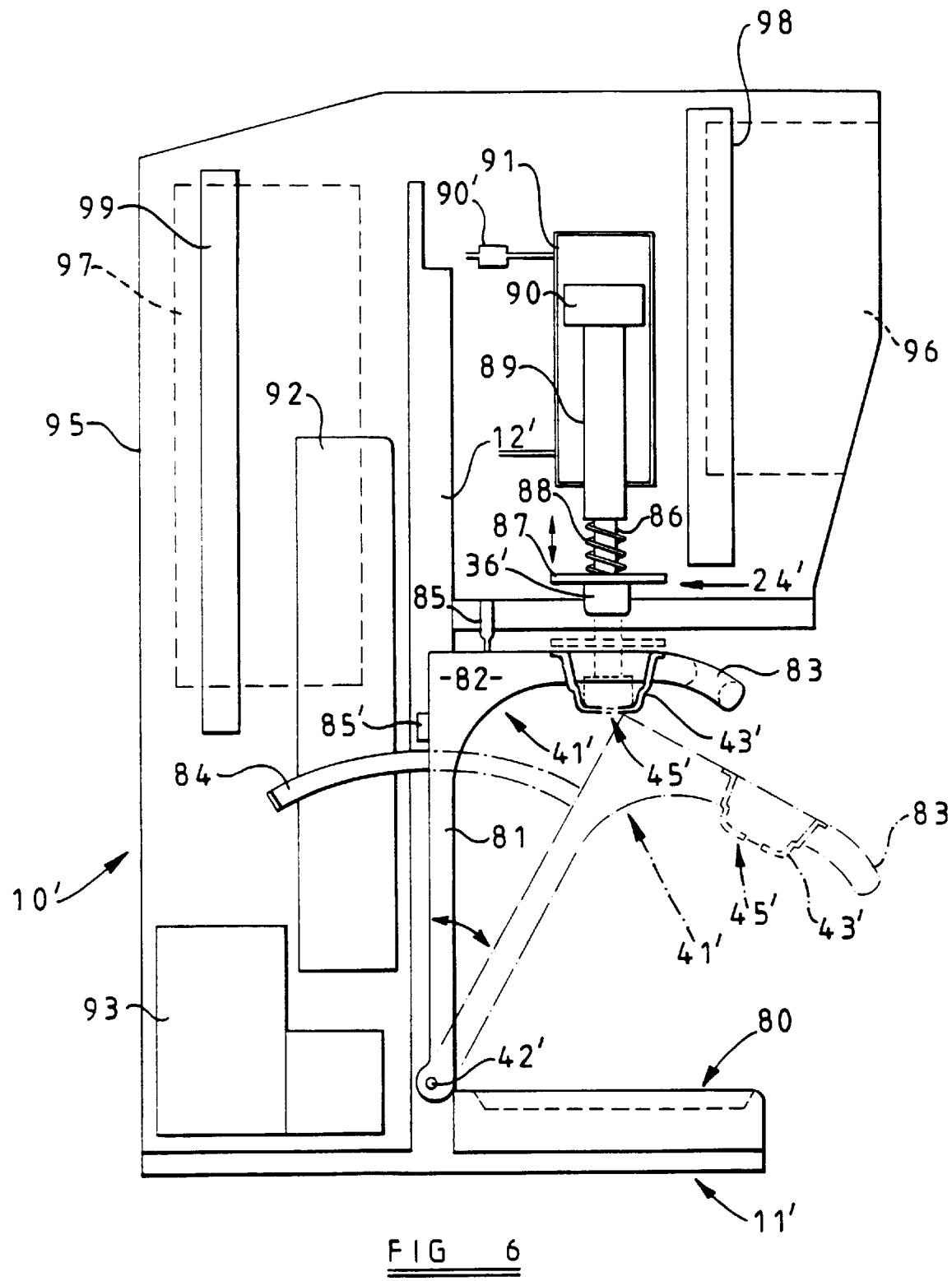
Figure 7:
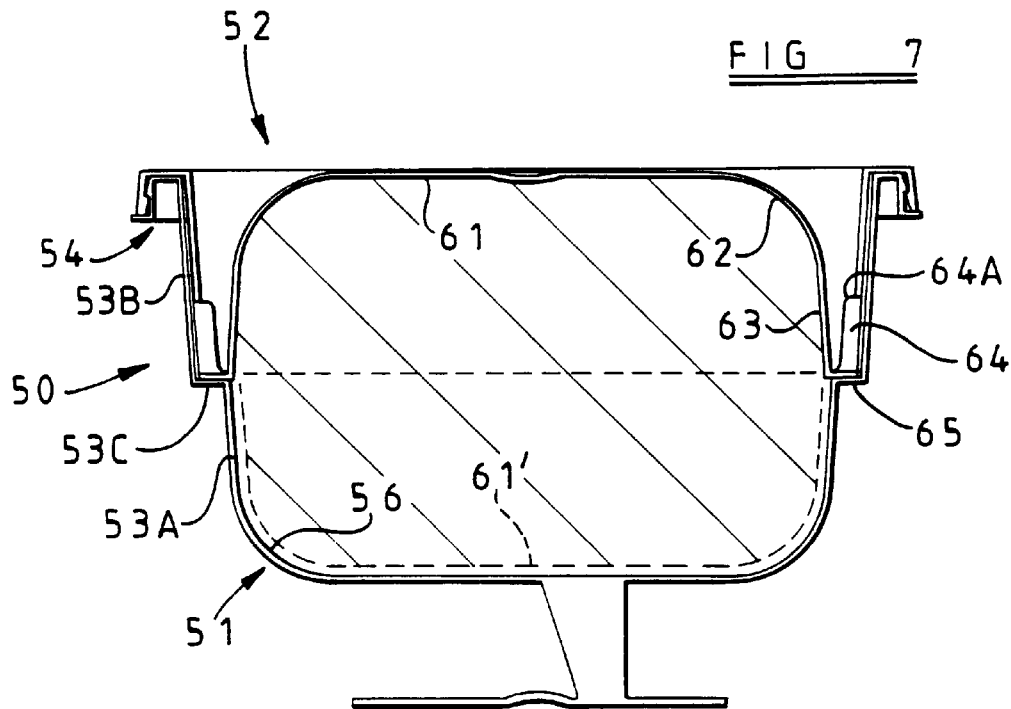
Figure 8:
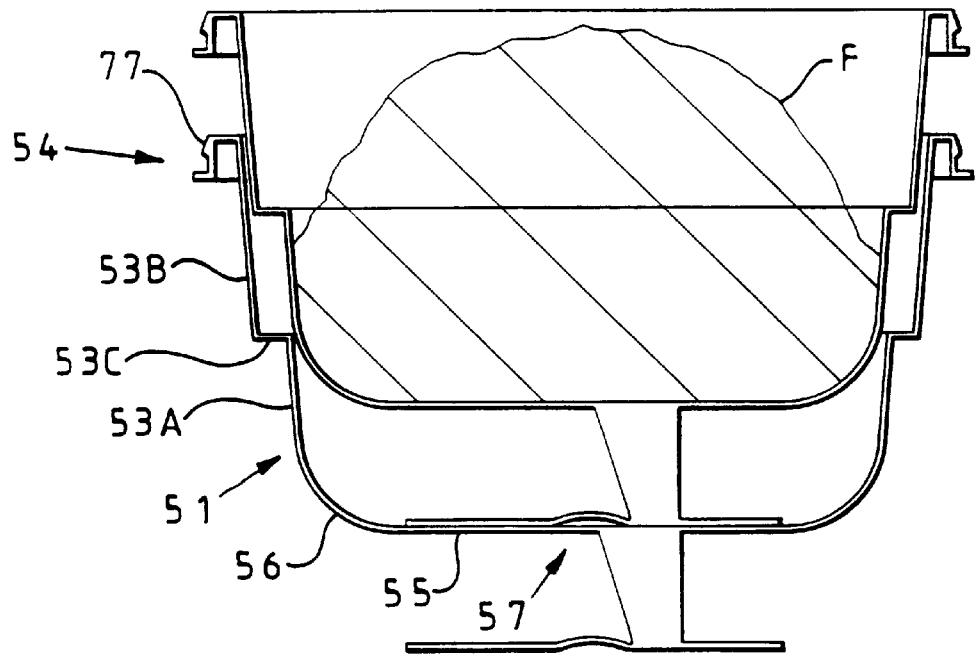
Figure 10:
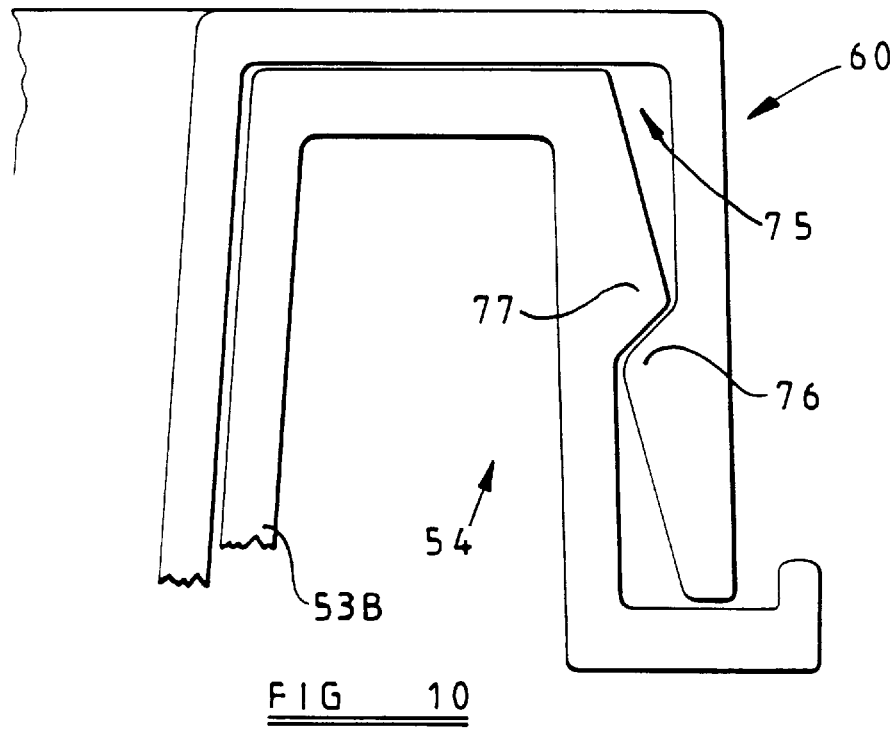
Figure 11:
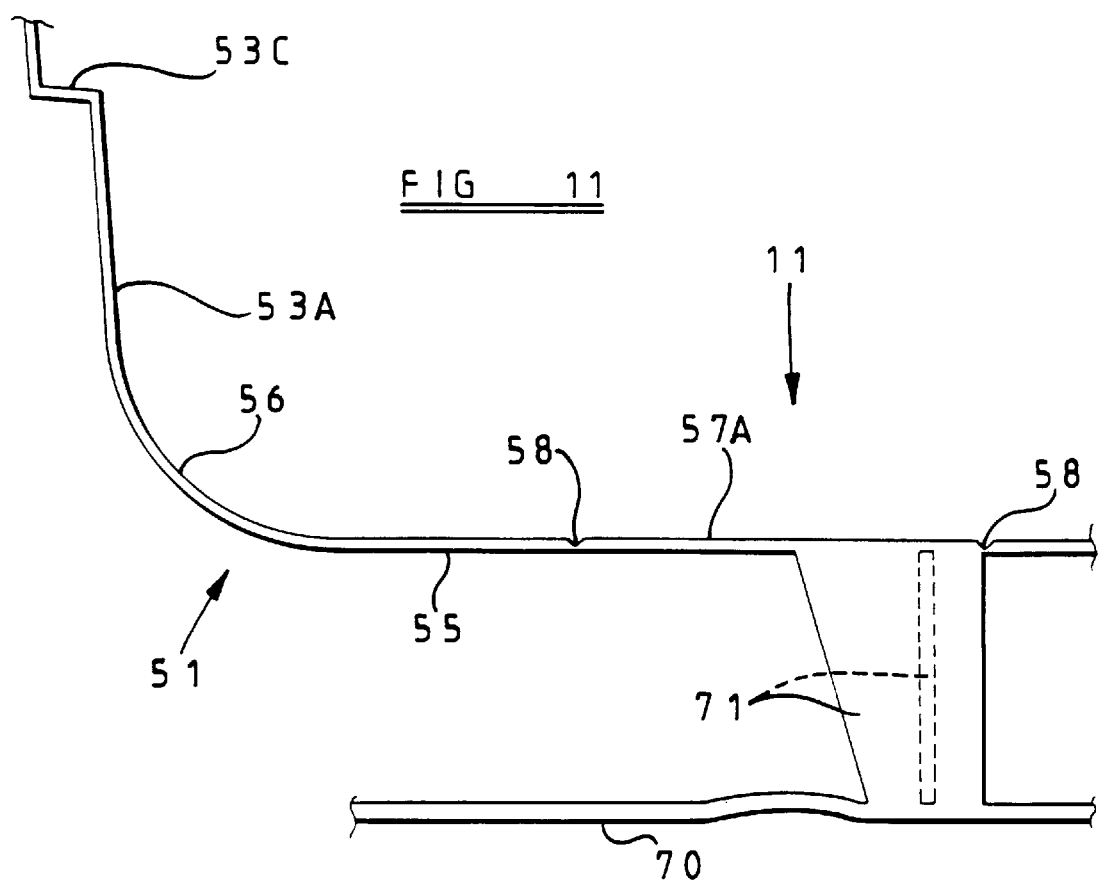
Figure 12:
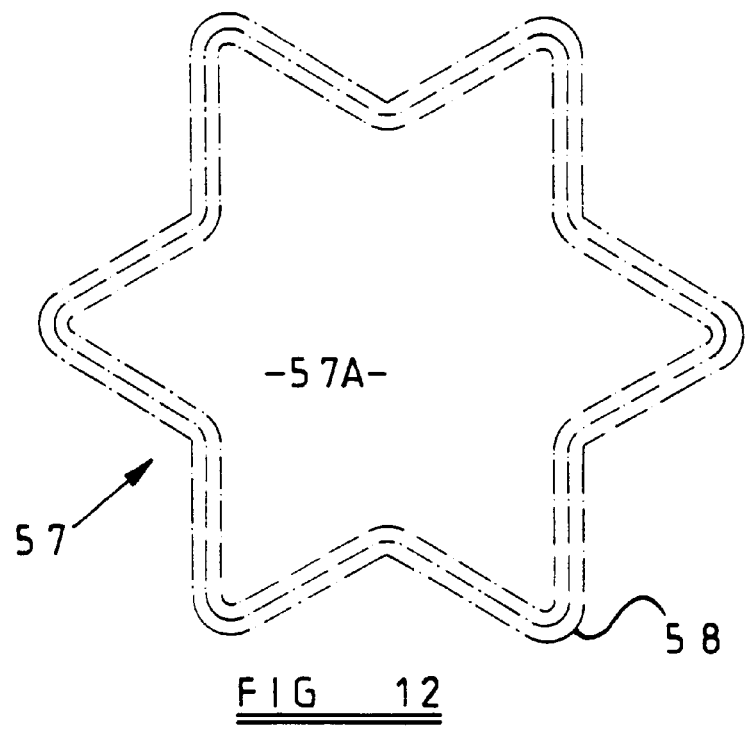
Figure 13:
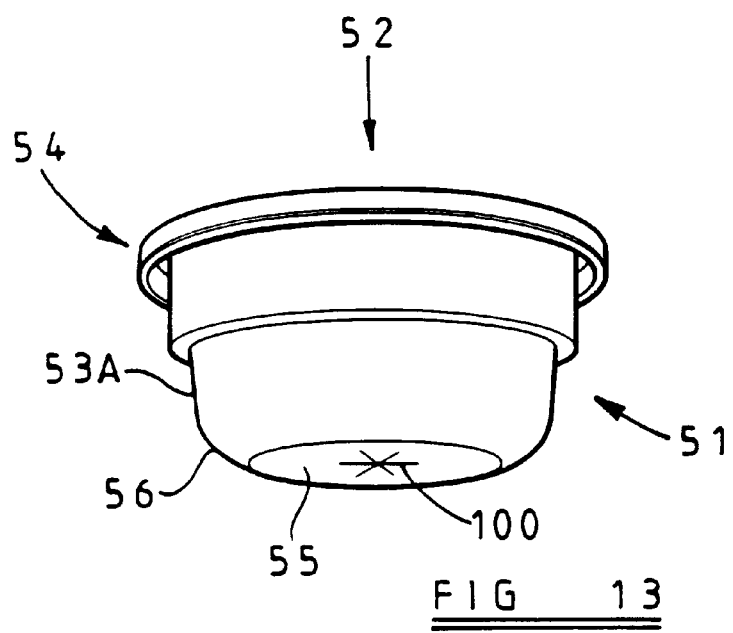
Figure 14:
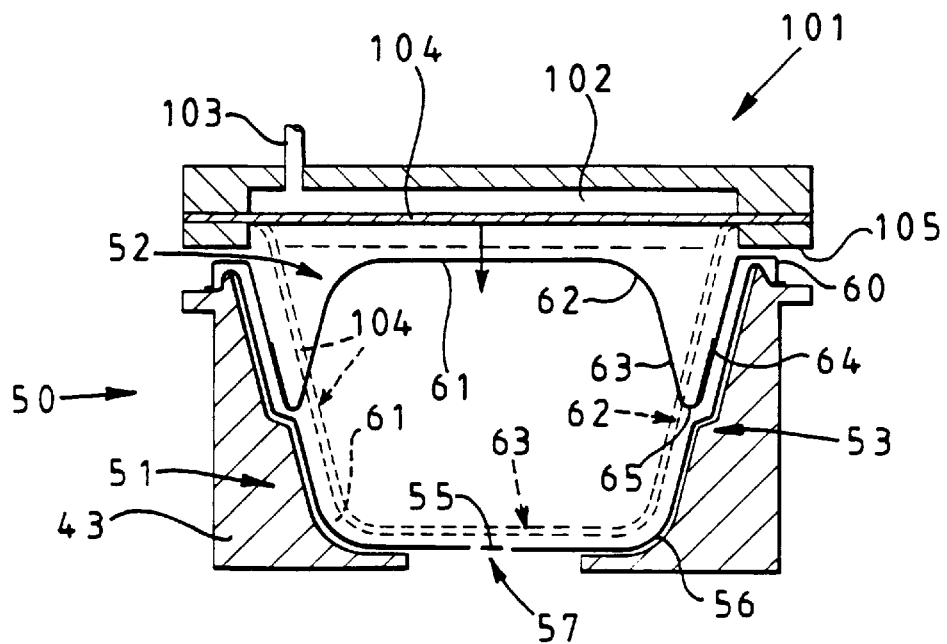
Figure 15:
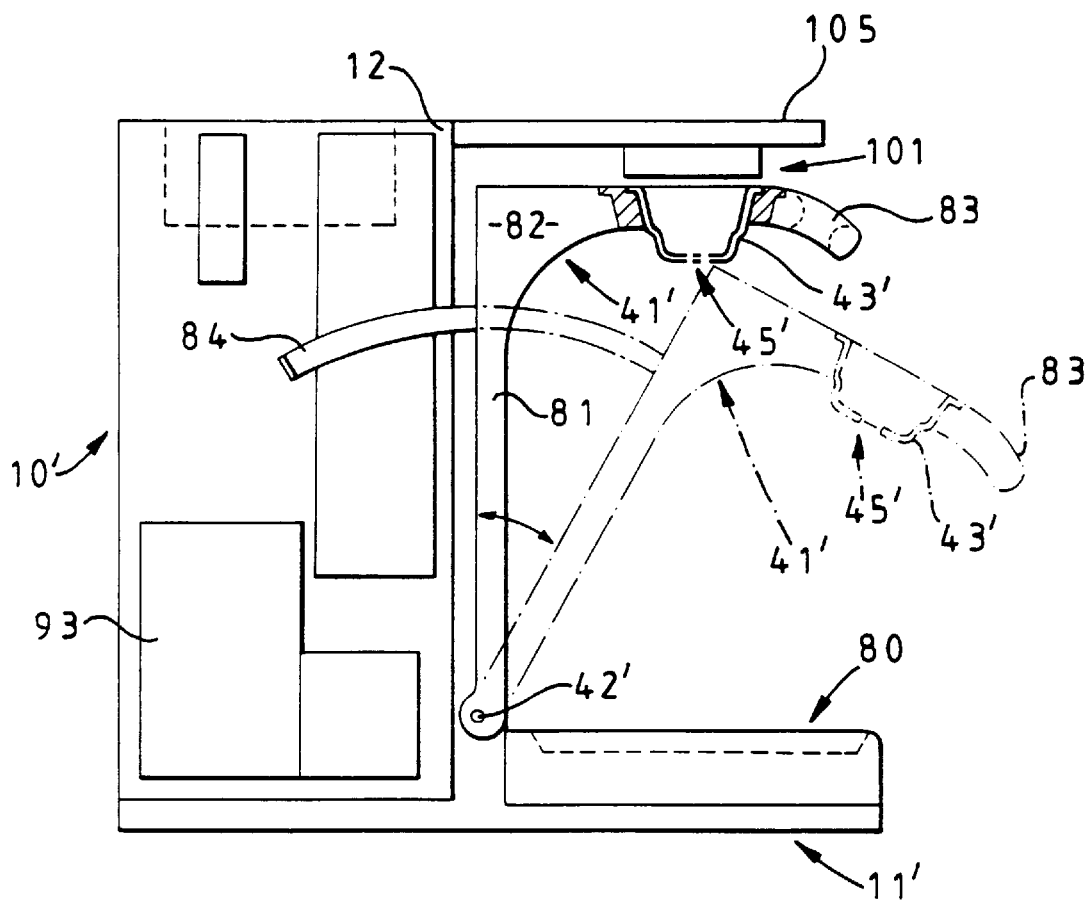
Figure 17:
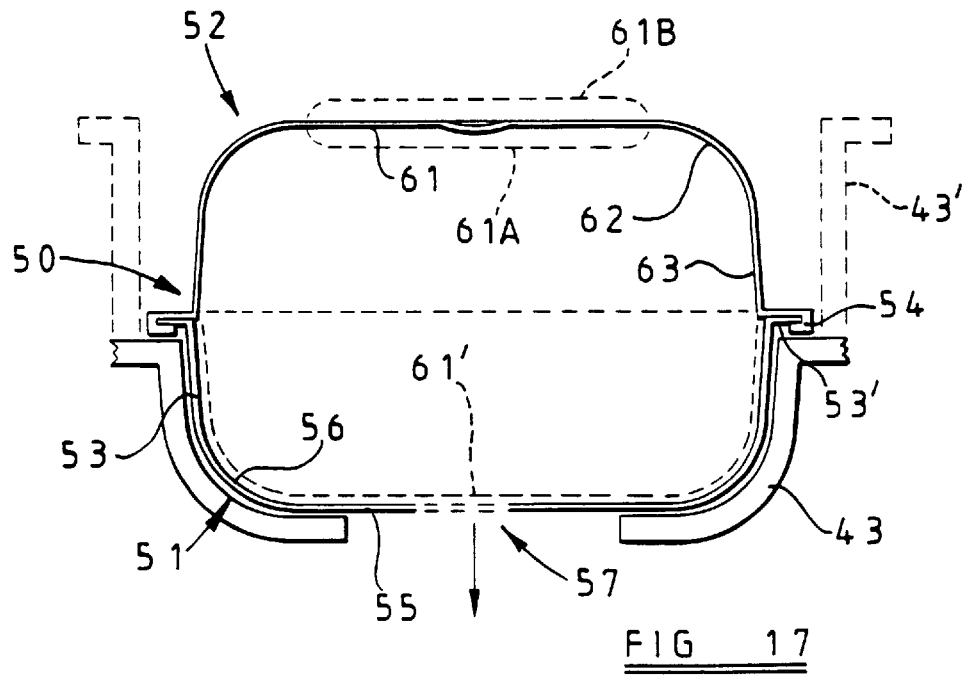
Figure 16:
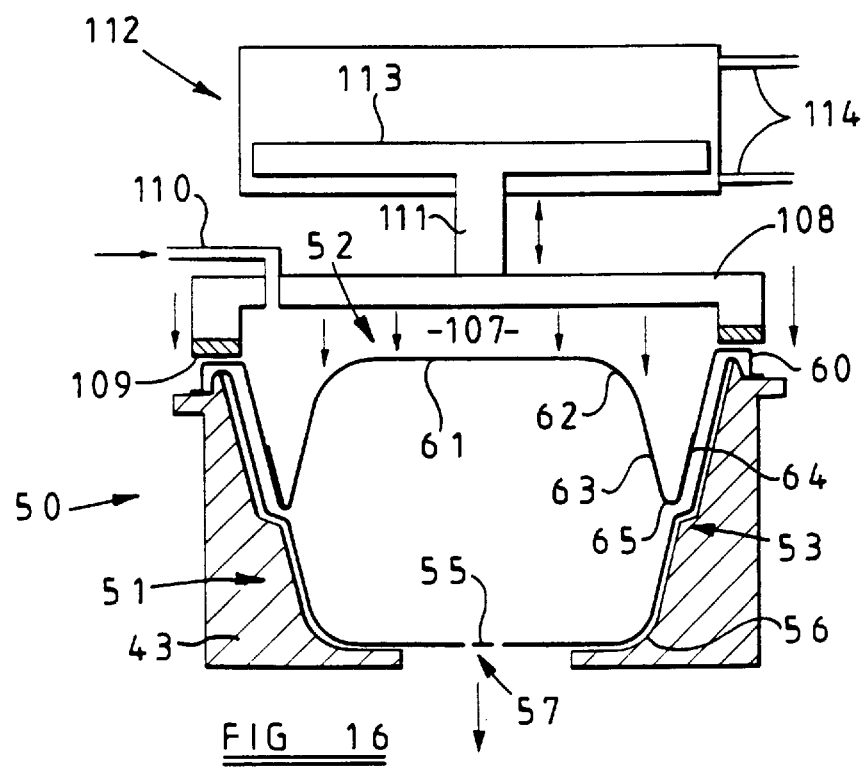
Figure 18:
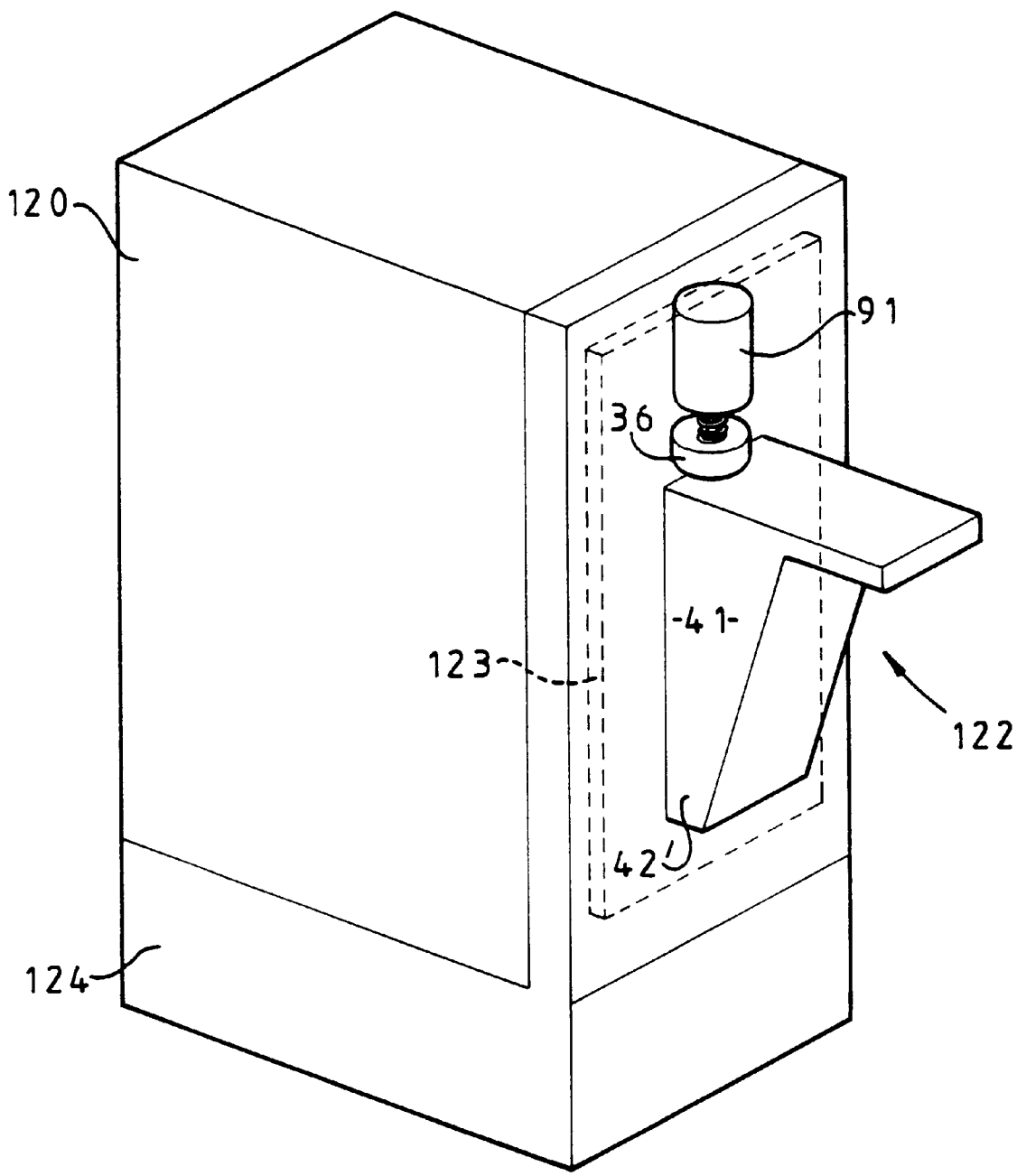

FIG. 3 is a vertical section through a plunger assembly portion of the apparatus of FIGS. 1 and 2, FIG. 3A is an alternative form of the assembly of FIG. 3, FIG. 4 is a section corresponding to that of FIG. 3 showing the plunger in an intermediate position, FIG. 5 is a view corresponding to FIG. 3 showing the plunger in a lowermost position, FIG. 6 is a side elevation of a second embodiment of the invention, FIG. 7 is a section through an assembled container for use with the apparatus of FIGS. 1–5, and FIG. 6, FIG. 8 is a part section through a base part of the container of FIG. 7 nested with another base part, FIG. 8A is a perspective view of the container of FIG. 7, FIG. 8B is a view corresponding to FIG. 8A showing the outlet opened, FIG. 9 is a part section through a top part or lid of the container of FIG. 7 nested with another top part, FIG. 9A is a perspective view of the top part of FIG. 9, FIG. 10 is a part section of the container of FIG. 7, FIG. 11 is a part section of the base part of the container, FIG. 12 is a plan view showing the opening in the base part of the container in the direction of arrow 11 in FIG. 11, FIG. 13 is in perspective view from below showing an alternative form of outlet opening, FIG. 14 is a sectional view showing an alternative form of deforming means for the container, FIG. 15 is a side elevation of dispensing apparatus incorporating the deforming means of FIG. 14, FIG. 16 is a cross-section through a further form of deforming means for the container, FIG. 17 is a cross-section through an alternative form of container, and FIG. 18 is a perspective view of dispensing apparatus incorporated with a housing for storing filled containers for use with the apparatus.

Referring to the drawings and firstly to FIGS. 1–5, dispensing apparatus for a dispensing system is manually operated and includes a vertically arranged frame 10 having a base 11 on which may be supported a receptacle (not shown) for product. The frame 10 includes upwardly extending frame members 12 at the uppermost end of which are mounted horizontal support arms 13. Between the arms 13 is rotatably mounted a shaft 14 on one end of which is carried for rotation therewith a lever 15. The lever 15 is movable between an upper inoperative position 15' through an intermediate position 15" and a lower position 15'".

Mounted centrally of the shaft 14 is a linkage assembly 17 including a pair of links 18 rotatably carried on the shaft 14. At the opposite ends of the links 18 is carried a spindle 19, the links 18 being pivotable relative to the spindle 19, and a further pair of links 20 depend from and are pivotally mounted on the spindle 19. As an alternative to the linkage shown other arrangements can be used such as a double cantilever arrangement, so that downward pressure on the plunger 36 is always in the vertical direction.

The further links 20 are interconnected at their lower ends by a spindle 22 which extends through the upper end of a rod 23 which is the operating rod of a plunger assembly 24 (shown in more detail in FIG. 3). The spindle 22 is rotatably mounted in a bore 25 in the rod 23.

The plunger assembly 24 includes a cylinder 26 which is mounted on the frame 10 by vertically arranged plates 27 attached at their upper ends to the horizontal support arms 13 and towards their lower ends to brackets 28 secured to the uprights 12. The brackets 28 and plates 27 are interconnected and together provide a support for the cylinder 26.

The cylinder 26 is open ended and receives coaxially the rod 23. The rod 23 carries fixed thereto an upper annular member 29 which fits within and for movement along the inner walls of the cylinder 26. Spaced downwardly from the annular member 29 and along the rod 23, and axially movable relative to the rod 23, is a generally cup-shaped member 30 comprising a further annular member 31 secured to a locating member 32 extending downwardly from the member 31 and defining an inner cylindrical bore 33. Towards the lower end of the member 32 is an annular tapered locating portion 34 which is spaced from the inner walls of the cylinder 26.

Carried at the lower end of the rod 23 is an engagement member or plunger head 36 secured for movement with the rod 23 along the cylinder 26. The lower end of the plunger 36 is formed with a flat surface 37 bounded by a curved periphery 38.

Engaging between the annular member 29 and the member 31 is a spring 40 which urges the member 31 in a direction away from the annular member 29 but is compressible to the position shown in FIGS. 4 and 5 so that the annular member 29 can move close to the member 31 during a dispensing operation.

The frame 10 also carries intermediate its ends a pivotable arm 41 which is located for pivoting on the uprights 12 about horizontal pivots 42. The arm 41 can pivot downwardly from the horizontal position shown in FIG. 1 to a downwardly inclined position 41' which is at an angle of some 50° to the horizontal position.

Towards the outer end of the arm 41 is located a support or seating member 43 for receiving a container 50 of product to be dispensed. The seating 43 defines a cup-shaped inner surface 44 in which containers 50, such as shown in FIGS. 7–13, can be received. At the lower end of the cup surface 44 is formed a central outlet opening 45 through which product is to be discharged from containers 50.

The arm 41 is retained in its upper horizontal position by a securing element 47 which engages over the end of the arm and over the brackets 28 but it will be appreciated that other securing means whereby the arm 41 may be released from a securing position, may be employed. Upon release of the securing element 47 the arm is movable downwards about pivots 42 to the inclined position 41' which is the position in which containers are placed in and lifted out of the receiving member 43.

Referring now to FIG. 6 a pneumatically operated dispensing machine is shown which utilizes the same containers 50 as the previously described machine. In the FIG. 6 machine similar reference numbers are given to parts equivalent to those of the machine of FIGS. 1–5.

The machine of FIG. 6 comprises a base 11' and an upwardly extending frame 10'. On the base 11' there is provided a tray 80 which is located spaced beneath the container dispensing position and extending upwards from the tray 80 is a main frame member 12' located generally centrally of the machine.

To the lower end of the main frame number 12' is a pivot 42' on which is pivotally supported an inverted L-shaped arm 41' having a longer upwardly directed limb 81 and a shorter outwardly directed limb 82. Towards the outer end of the limb 82 is located a handle portion 83 by which the arm 41' is moved manually between the upright position shown in full lines in FIG. 6 and the inclined inoperative position, shown by chain lines. In the inoperative position the arm is presented to the user for the removal by lifting out, of empty containers from a seating 43', and for the location of full containers 50 in the seating 43'. Movement between the two positions is, in the illustrated embodiment, by moving the arm 41' using the handle 83.

The arm 41' carries a pair of arcuate support members 84 which extend through slots in the frame 12' and locate the arm 41' in the operative and inoperative position by engagement with the machine frame 10 and by the use of catches to hold the arm 41' in the required position. A magnetically or pneumatically operated catch is used when the arm is in the operative position and the support members 84 may have stops for location in the inoperative position. There is shown a positive locking pin 85 moved by a pneumatic cylinder between a release and a locking position in which the arm 41' is locked, the pin engaging in a recess in the arm 41 in the locking position. A position detector 85' is also provided to detect when the arm 41' is in the operation position.

The outwardly directed portion 82 of the arm 41' is provided with a seating 43' in which containers 50 are located, the seating being shaped to receive the containers 50 and the seating 43' being removable from the portion 82 for cleaning purposes, if required. Centrally and in the base of the seating is provided an outlet opening 45' for permitting passage of the product in the container 50 from the container outlet 57 through said opening.

Located above and axially aligned with the seating 43' is a plunger 36' forming part of a plunger assembly 24'. The plunger 36' is generally cylindrical having a lower flat portion merging through curvilinear portions with the body of the plunger, as in the previous embodiment. The plunger 36' is carried on a rod 86 and slidable along the rod 86 is an annular disc 87 which is spring urged by a spring 88 towards the upper end of the plunger 36'. Thus the annular disc 87 is moveable relative to the plunger 36' along the rod 86.

The rod 86 is mounted at its upper end on a piston rod 89 and piston 90 located within a pneumatic cylinder 81. Thus the piston 90 and the rod 89 are moved up and down by the introduction of pressurized air into the cylinder 91 to cause the plunger 36' to be moved vertically up and down, such movement being movement for discharge of the product from containers 50.

Supply of air to the cylinder 91 is from a reservoir 92 of pressurized air which is supplied from a motor and compressor 93 carried on the machine. Control valves (not shown) control the operation of the piston and cylinder arrangement 89, 90, 91 and there are also provided interlock valves or proximity detectors to ensure that the plunger 36' cannot be moved except when the arm 41' is in the operative position and the arm 41' is locked by pin 85 and when there is a container of product 50 located in the seating 43'. Further controls can also be provided for timing the introduction and exhaust of air from the cylinder 91 so that the operator simply initiates the discharge sequence. If required the speed of operation can also be controlled and adjusted manually or automatically by valve means 90' according to the hardness of the product and the ease of extruding the product through the container outlet by control of the air pressure to the cylinder 91.

The sequence of operation of the machine FIG. 6 is to locate a container of product 50 in the seating 43' when the arm 41' is in the inclined receiving or non-operative position. The arm 41' is then moved to its vertical position in which the seating 43' lies directly below the plunger 36' and the plunger is operative, by manual movement of the arm using the handle 83.

An operative movement of the plunger 36' is initiated automatically or by a switch so that the plunger moves downwardly towards the container 50 and the annular disc 87 engages with the top edge of the container 50 and remains in this position during the continued movement of the plunger 36' against the action of spring 88 to fully discharge the contents of the container through the outlet in the container and through the opening 45' in the seating 43'.

During discharge a receptacle (not shown) for receiving product from the container 50 is located below the container discharge outlet. The disc 87 may include a downwardly directed shroud (not shown) to prevent access by the operator to the plunger.

Considerable force is exerted during the discharge operation and this is resisted by the arm 41' which is of robust construction. Further details of the discharge operation will appear from the following description since the container operates in a similar fashion for both embodiments of dispensing machine.

The FIG. 6 embodiment includes a casing 95 surrounding the components of the machine and there are provided light boxes 96 and 97 towards the front and rear of the machine respectively and lit by light sources 98 and 99. The light boxes are transparent or translucent and intended to illuminate advertising material or information for the assistance of the operator applied to the casing.

Referring now to FIGS. 7–13 the container 50 (shown assembled in FIG. 7) for product is formed of two parts, a base part 51 (FIG. 8) and a top, closure or lid part 52 (FIG. 9) which may each be formed of plastics or cardboard. The base part 51 has tapered lower and upper side wall portions 53A, 53B between which is a shoulder 53C which walls taper outward in the upward direction terminating at the upper edge in a lip 54, the angle of taper being suited to enable base parts 51 to be nested one within the other as shown in FIG. 8. A suitable angle is some 5° to the vertical or an inclined angle of 10°.

A base surface 55 of the base part 51 is generally planar, merging into the side walls 53 through a radiused portion 56. Centrally of the base portion 55 is formed an outlet 57 (see particularly FIG. 8A, 8B, 11 and 12) which is formed of weakened radial, star-shaped lines 58 which are capable of being opened up to form an outlet. The outlet may be formed under pressure of product in the container or by being formed of a removable part 57A (as shown in FIG. 12), removal of which breaks through the weakened portions.

In the arrangement shown in FIGS. 7–12 the outlet 57 is provided by defining a star shape by the weakened or thinned portion 58 of the base 55. A removal element 70 in the form of a disc shaped element is attached to the part 57A of the base 55 within the star 58 to be removed by connecting elements 71 whereby when the element 70 is grasped and tilted downwards the central part 57A of the base 55 within the star is detached to provide a star-shaped outlet opening 57 in the base portion 55 through which product is discharged.

The top part 52 (FIG. 9) of the container 50 includes a peripheral lip 60 which is arranged to engage over the lip 54 of the base part 51 to secure the top part 52 to the base part 51 and seal the interior of the container. The interfitting of the lip 60 with the lip 54 is, as shown, by a clip action, but it may be by welding, heat sealing or by the parts being a close fit in one another.

The clip arrangement by which the top part 52 is secured to the base part 51 is shown more clearly in FIG. 10. The peripheral lip 60 on the top part 52 is formed with a downwardly directed annular channel 75, the outer internal side of which is formed at 76 with a thickened region.

The lip 54 on the base part 51 is arranged to fit into the channel 75 and has a thickened region 77 which interfits with the thickened region 76 when the parts 51 and 52 are brought together to hold the top part 52 onto the base part 51.

The top part 52 has a central deformable region 61 which is generally planar in the form of a disc but which merges through a radius 62 with deformable folded over portions 63 and 64, the lip 60 being formed at the upper edge of the folded over portion 64. At the junction between the downwardly directed folded over portion 63 with the upwardly directed folded over portion 64 there is a portion 65 which, when the top part 52 is assembled to the base part 51 is located half way down the base part 51 and against the shoulder 53C. The portion 64 is thickened towards its lower end to provide a shoulder 64A for when top parts are nested together and to prevent the parts locking together. The portion 64 is tapered to match the taper of the side wall 53B of the base part.

At least the regions 61, 62 and 63 of the top part 52 are formed of flexible material so that the top part can deform during dispensing of product from the container 50 and due to engagement of the plunger 36 with the central region 64 of the top part 52.

In use of the container the base part 51 is normally stored with a plurality of base parts nested together (FIG. 8). Individual base parts 51 are released from the nested parts and are presented to a product filling machine, which may be of known form, by which the base part 51 is filled with a predetermined amount of product above the level of the shoulder 65 of the part 51 as shown in FIG. 8 at F. A top part 52, also normally stored nested together (FIG. 9), is denested then fitted to the base part 51 until the parts are secured together, in which position the folded over portion 64 lies closely adjacent the inner side wall 53B of the base part, as shown in FIG. 7.

In the assembled condition the container containing product may be frozen, transported and stored. Prior to dispensing of product from the container 50 the product may be tempered to a suitable dispensing temperature in the case of ice cream or other frozen confectionery product or, in some cases, the product within the container may be heated by microwave means.

When it is desired to dispense product from the container 50 using the dispensing apparatus of FIGS. 1–5 of the invention a container is located in the seating 43 with the arm 41 in its lowered position 41'. The arm 41 is then raised to the horizontal dispensing position and held in place by the securing element 47. At this time the lever 15 is in its raised position. A proximity detector (not shown) may be provided to detect that a container 50 is in position in the seating before a discharge operation is started. To dispense product from the container 50 the arm 15 is lowered manually which causes, through the linkage 17, the rod 20 to be moved in a downwards direction from the position shown in FIG. 3 towards the position shown in FIG. 4.

At the FIG. 4 position the tapered portions 34 have entered the space between the folded portions 63 and 64 to secure the top part 52 to the base part 51 with the container engaged with the seating 43 with the lip 54 over the top edge 43A of the seating. Only when this securing action has been performed is the plunger 36 engaged with the central region 61 of the top part 52 and the member 32 is prevented from further downward movement. The rod 23 continues to move downwards so that the member 32 slides over the rod compressing the spring 40, the surface 37 of the plunger member 36 engages the region 31 and deforms the top part downwardly reducing the internal volume of the container 50 and causing product in the container to be discharged through the outlet 57 as the central region 61 of the top part is deformed towards the base surface 55 of the base part 51. During this movement the downwardly directed portion 63 of the top part 52 unfolds downward so that it lies adjacent the inner wall 53A of the base part 51 at 61' (FIG. 7).

Upon completion of the movement of the plunger part 36 towards the base 55 of the base part 51 the plunger has adopted the position shown in FIG. 5 and the container is substantially emptied of product. During discharge of product through the outlet 57 the product is shaped according to the shape of the discharge outlet 57 and the product is discharged into a receptacle below the opening 45 the receptacle being sized to match the capacity of the container. Upon completion of the stroke of the plunger part 36, at which the lever 15 is in the position 15''', discharge of the contents of the container 50 is complete. The lever 15 is returned to its initial position, the securing means 47 is released from the arm 41 and the empty container, still remaining in the seating 43 by engagement of the locating means 32 with the container 50, is removed therefrom. The apparatus is ready for a fresh dispensing operation by location of another container in the seating 43.

In FIG. 3A there is shown an alternative form of locating means 32' in which the tapered lower end is replaced by a generally flat end which in use engages the top outer edge of the assembled container.

It has been found that this gives adequate support for the container whilst avoiding any tendency for the container to require release from the plunger assembly after a discharge operation.

A similar apparatus to that described in FIGS. 1–5 can be provided in which the plunger movement is power operated by a piston and cylinder arrangement or powered means, such as is shown in FIG. 6.

In the dispensing of product from the machine of FIG. 6 this operation is similar but it will be noted that the plunger 36' does not incorporate the portion 34 since such portions 34 are not always found to be necessary. Moreover the top edge of the container 50 is simply engaged by the annular disc 87 in the FIG. 6 machine.

The machine of FIG. 6 is arranged so that this plunger cannot be operated unless the container is in the operating position beneath the plunger. This may be by means of an interlock (not shown) detecting the location of a container in the seating and detecting the position of the arm in the upright position. Further controls may be provided for automatically energising the plunger when the interlocks detect that a dispensing operation can be performed and for returning the plunger to its upper position when the container is fully discharged. The controls can also control the rate of discharge according to the speed of the plunger movement, and whether the stroke of the plunger is interrupted for partial discharge of the container contents. Alternatively container discharge and plunger movement may be manually initiated by suitable switches. The air reservoir of the FIG. 6 embodiment enables repeat discharge of product beyond the rate of supply of the air compressor, for rapid repeat operation of the dispenser. Safety interlocks are also provided for avoiding any danger to the operator from the plunger movement.

It will be seen that the container is supported in the seating 43 during discharge of its contents with the top portion 52 firmly secured to the base part 51 during discharge and substantially the whole of the contents of the container may be discharged therefrom. The amount of product within the container can be selected according to requirements to be the size of a predetermined portion of product to be received by a receptacle. Alternatively several portions may be discharged from the same container simply by halting the movement of the discharge plunger 36 in an intermediate position when sufficient product has been discharged. Thus the container 50 may be of any suitable size to suit requirements.

It will be seen that at no time during the discharge operation should product contaminate the apparatus because the top part of the container 52 remains sealed to the base part 51 and product from the outlet 57 is directed directly into a receiving container. Nevertheless the seating 43 and the associated parts of the apparatus may be readily removable for cleaning purposes.

FIG. 13 illustrates an alternative outlet arrangement for the container 50 which is in many respects the same as the previously described container. In the FIG. 13 arrangements instead of the star shaped portion 57A providing the outlet for discharging product from the container the container is formed with weakened lines 100 radiating from a central position or the lines 100 can be slits or discontinuous breaks in the base of the container. During discharge from the container pressure of product will cause the triangular portions between the lines 100 to be bent outwardly from the centre and permit the product to discharge from the container.

Since the product within the container will usually be semi-solid and frozen the product should not be able to escape through the opening prior to a dispensing operation. In addition however the container of FIG. 13 may be located within a sealed bag which may contain information concerning the product. Thus to utilize a container of this kind it would first be necessary to remove the bag from the container before placing it in the seating 43 but it would not be necessary to make any opening in the base of the container. Alternatively the portion 57A may be covered with a removable seal such as a peel off seal or a seal which in itself is opened up by the pressure of product being discharged.

Instead of the container being of circular section, as illustrated, the container may be of other suitable shapes, for example elliptical, square or rectangular, in the latter forms having radiused corners. The container is preferably formed from plastics by thermoforming.

It should also be understood that the container may be formed so that the discharge opening 57 is formed in the part 52, hitherto called the top part or lid. In this case the container 50 would be located in the dispensing apparatus in the inverted position and the plunger 36 would engage and deform the parts 55, 56 and 53A of the part 51 into the parts 61, 62 and 63 of the part 52 to discharge product from the opening 57 in the part 52, the opening 57 being formed in the manner described in relation to the illustrated container. Similarly the modified container would be located and retained in a seating as previously described.

Instead of the interfitting arrangement of top and base parts described other arrangements may be used. For example the side wall 53B of the part 51 and the side wall 64 of the part 52 may have cooperatively shaped profiles so that one is located in the other to secure the parts together, as by contoured indentations or lugs.

As an alternative to the seating 43 shown the seating surface may terminate short of the portion 56 of the part 51 to further reduce any chance of product being deposited on the seating 43.

Although the dispensing apparatus and, in particular, the plunger assembly, is, as described, arranged to have a location movement followed by a discharge movement, the use of a movable support for the container which is lifted up into position towards the plunger assembly may enable the location movement of the plunger assembly to be omitted or modified. Location of the container relative to the plunger assembly may be wholly or, in part, achieved when the container is located relative to the plunger assembly. However it is normally necessary to have relative movement and apply force between the plunger assembly and the container support in order to firmly locate the container during dispensing.

Moreover the apparatus provides simple and cost effective means for hygienically dispensing the product into any suitable receptacle such as a dish, bowl or an edible receptacle, for example a cone. A wide variety of product can be dispensed by the apparatus depending only on which product is filled into the containers.

Due to the arrangement of the apparatus the user can readily locate containers of product on the apparatus because the seating 43 is presented towards the user to readily locate containers in and out of the seating. This is achieved without having to have an unduly long stroke of the rod 20 to afford room for location of containers below the operating plunger.

Referring now to FIGS. 14 and 15 there is shown the container previously described (see in particular FIG. 7) utilized with an alternative form of means for deforming the container to obtain discharge of product therefrom. In this arrangement the same reference numbers are used for similar parts to those in previous embodiments.

When the container 50 is located in a dispensing or discharge position there is located above the container 50 a compressed air manifold member 101 defining a chamber 102 communicated with a source of compressed gas through a duct 103. A flexible membrane 104 defines the lower side of the chamber 102, the membrane being formed of resilient, flexible material which has a high degree of extensibility. The membrane 104 is conveniently formed with radial convolutions to obtain additional extension from the retracted position, the convolutions returning to their initial position after extension.

At the lower side of the manifold member 101 is an annular plate 105 which is engagable with the upper outer rim or lip 60 of the container 50. To deform the container 50 and discharge the contents thereof compressed gas is admitted through duct 103 into the chamber 102 whereby to deform the membrane 104 downwards into contact with the lid 52 of the container. The portion 61 of the lid is deformed downwards discharging product through the outlet 57 until the portion 61 is deformed into contact with or closely adjacent the inner surface of the base 51 whereupon the container is substantially empty.

Upon emptying of the container gas is exhausted from the chamber 102 and the membrane 104 resumes its initial position. The membrane 104 may be provided with a spring return arrangement (not shown) between the membrane 104 and the housing 101.

As a safety feature there is provided an interlock (not shown) to ensure that gas cannot be admitted to the chamber 102 unless there is a full container 50 in the discharge position in the seating 43. The pressure and rate of flow of gas into the chamber 102 is controlled and adjustable according to the rate of discharge of product required, the nature of the product and the size of the container. At a predetermined pressure gas may be admitted for a predetermined period of time which is adjustable. A suitable material for the membrane 104 is polyurethane or other material which can resume its initial position without permanent distortion.

The manifold member 101 can be replaceably mounted on the apparatus to ensure that adequate sealing is retained and for the possibility of cleaning although such manifold would not normally come into contact with the product.

In FIG. 15 is shown one way in which the manifold 101 can be mounted in dispensing apparatus, the apparatus being in other respects similar to that shown in FIG. 6. The manifold member 101 is mounted on a rigid arm 105 on the frame 12 of the apparatus. If desired the manifold member 101 may be vertically moveable into engagement with the container rim 60 after location of the container 50 in the dispensing position.

It will be seen that with the arrangement of FIG. 14 the use of a pressurized membrane 104 ensures that pressure is applied to the lid 52 of the container 50 laterally as well as vertically helping to ensure that the lid 52 remains firmly connected to the base 51 and also allowing for the discharge of product which may contain pieces such as fruit and nuts within the product. The arrangement takes up little space and is simple in construction.

Referring now to FIG. 16 there is shown a further arrangement for deforming the container 50 for obtaining discharge of product therefrom, the same container 50 being shown as in the previous embodiments (as shown in particular in FIG. 7). In this arrangement compressed gas is applied directly to the lid 52 of the container by defining a manifold chamber 107 between the lid 52 and a sealing member 108 located above and in sealing contact with the upper lip 60 of the container 50.

The sealing member 108 is formed with an annular seal 109 of resilient material which is arranged to be urged into sealing engagement with the rim 60. The sealing member 108 is of inverted cup shape and is provided with a duct 110 for admitting and discharging compressed gas into and from the chamber 107.

The sealing member 108 is carried on a piston rod 111 of a piston and cylinder arrangement 112 having a piston 113 and inlet and outlet ducts 114 communicating with a source of compressed gas including a gas reservoir (not shown).

To obtain discharge of the container 50 the container is located in a discharge position in apparatus similar to that of FIG. 15. When it is detected that a full container 50 is located in such position on seating 43 compressed gas is admitted to the piston and cylinder 112 to move the sealing member 108 downwardly with the seal 109 urged into engagement with the lip 60. When a full seal is achieved compressed gas is admitted into the chamber 107 through duct 110 to pressurise the lid 52 of the container. The deformable portion 61 of the container is deformed downwards towards the base 51 of the container for discharge of product through the outlet 57 in a similar manner to that previously described so that the portion 61 after completion of a discharge movement lies closely adjacent the inner surface of the base 51.

After discharging the product from the container the air pressure in the chamber 107 is released and the piston 113 is returned to its upper position releasing the sealing member 108 from engagement with the container. The seating 43 is then moveable towards a container release position.

Instead of the sealing member shown in FIG. 16 other sealing means may be employed, for example a sealing arrangement in which opposed sealing members move towards one another to grip the rim of the container 50 between them prior to pressuring the space above the lid 52 of the container. Again piston and cylinder means may be employed for obtaining relative movement between the sealing members.

The diameter of the piston and cylinder 112 is relatively large and the stroke of the piston 113 is relatively short to ensure that the force being applied to the container by the seal 109 exceeds the back pressure through entry of air into the chamber 107 and an adequate seal is maintained with the container.

As with the previous embodiment the use of the pressurised chamber 107 ensures that pressure is applied equally to the lid 52 both vertically and laterally and the lid 52 remains adequately secured to the base 51. As before the duration and pressure of air supplied to the chamber 107 is adjustable and in accordance with the product requirements. The sealing member 108 may be removably associated with the rod 111 for ready replacement and/or cleaning.

Referring now to FIG. 17 there is shown an alternative form of container 50 for use with any of the embodiments of the apparatus of the invention. In this container the same reference numbers are used for similar parts to those in previous embodiments.

The base 51 of the container 50 is formed of relatively rigid material and in use is located in a suitably shaped seating member 43. The base 51 has an outlet 57 which can be in any of the forms previously described but is preferably formed centrally of the base using the arrangement of FIG. 13 having lines of weakness radiating from a central point. The outlet 57 is conveniently covered before a discharge operation by a sealing strip (not shown) which may be peeled off or which opens up when discharge takes place.

The base 51 is of generally circular cross section which is flat over its lower surface 55, has tapered side walls 53 merging with the base 55 through radiused portions 56. At the upper edge of the side wall 53 is formed an out-turned lip 53' arranged to sealingly engage with a corresponding lip 54 of the lid 52.

The lid 52 is of different form to the previous container embodiments and comprises an inverted cup-shaped deformable portion 61, 62 and 63 which mirrors the shape of the base 51, the portion 63 being generally cylindrical but tapered inwardly towards its upper end. The top surface is generally flat and merges with the wall 63 through a radiused portion 62. However the lid may have a concave depression, as at 61A, prior to assembly with the base, the depression being able to take up a convex shape, as at 61B after filling and assembly. The lip 54 is formed at the lower end of the side wall 63 to engage over the lip 53' of the base 51. Alternatively the lips 53 and 54 may be connected to one another in a different manner, such as by heat sealing to ensure that, once assembled, the container parts 51 and 52 are sealingly secured together.

During discharge of the container of FIG. 17 the portions 61, 62 and 63 are deformed downwards into the base 51 until the portion 61 becomes closely adjacent the inner wall of the base 51 at which time the contents of the container are substantially discharged through the outlet 57.

Filling and discharge of the container of FIG. 17 may be achieved in the manner described in relation to the previous embodiments. Thus filling of the container is achieved before assembly of the lid 52 with the base 51 in the manner previously described for the other embodiments of container, product being placed into the base 51 above the upper level of the base in order that the container, when assembled, is substantially filled. Alternatively product may be introduced into the container 50 when the container parts 51 and 52 are assembled by introduction through the opening 57. The opening 57 may be formed in the manner of the other containers described but preferably with the arrangement of FIG. 13, with or without a sealing strip. The outlet may be formed in the lid 52.

Discharge of the filled container may be by use of the plunger arrangements shown and described in relation to FIGS. 1–5, or FIG. 6. Alternatively discharge may be by the arrangements shown and described in FIG. 14 or FIG. 16. The container of FIG. 17 provides a simplified form of container compared with that of the previous embodiments. If required the seating 43 can have upward extensions 43', shown in FIG. 17, according to the arrangement used for deforming the container.

Referring now to FIG. 18 there is shown dispensing apparatus incorporating a housing 120 which is arranged to be refrigerated and insulated and to store containers of product for use in the dispensing apparatus shown generally at 122. The apparatus for discharging the containers of product may be of any of the forms previously described but the illustrated arrangement 122 is based on the apparatus of FIG. 6 having an arm 41 and operating plunger 36. The dispensing apparatus is mounted on the front of the housing 120 on a panel 123 which is conveniently in the form of a door mounted on vertical pivots (not shown) at one side of the door to gain access into the interior of the housing 120. In the base of the housing is located a compartment 124 in which is contained an air compressor and reservoir (not shown) or a compressed gas cylinder for powering the dispensing apparatus. The housing 120 may be formed with a series of shelves for locating the containers 50 at the desired temperature. Access to the containers may be through the door 123 but, since opening the door 123 will cause the refrigerated compartment formed by the housing 120 to warm up, other arrangement can be made for gaining access to the containers 50. For example a series of drawers of insulating or non-insulating material may be located within the housing 120, the housing itself also being insulated. Thus opening the door 122 to gain access to a drawer does not result in the containers in the other drawers being warmed.

As a further possibility there may be located in the housing 120 behind the door 123 heat retaining flaps suspended from the upper end of the door opening through which access can be gained to the containers, similar to known "push through" selection systems used in refrigerated cabinets.

The compartment 124 may also house refrigeration equipment for the housing 120 and the refrigeration equipment may include a forced air fan for circulating cold air around the housing 120. A "cold wall" evaporation system may also be incorporated to avoid the need for regular defrosting. Defrosting can then be part of regular weekly maintenance. The housing 120 can be used for tempering or warming up the containers 50 introduced at low temperature to the preferred dispensing temperature of the product. The housing may include a heat sink for providing a thermal storage of "cold" to give more rapid cooling for the heat sink when required. A fan may be provided to direct air for cooling over the heat sink.

As a further alternative the housing 120 may be arranged so that the containers descend by gravity from the upper part of the housing towards the lower part as containers are used, there being an entry into the housing 120 at the lower region thereof for removing the containers, such entry being a flap, drawer or similar arrangement.

As a further alternative the housing arrangement described may be provided independently of the dispensing apparatus.

Moreover the housing 120 may be arranged with the compartment 124 at the top of the housing, and coin-freed dispensing of containers 50 from the housing may also be provided. For each of the embodiments of dispensing apparatus described other drive means may be used, for example containers of compressed gas (FIG. 6, 14 and 16), or by mechanically operated drive piston (FIG. 6).

The containers described are conveniently sized and the dispensing apparatus arranged to enable a single portion of product to be contained and dispensed from each container. Differently sized containers may be provided for serving different sized portions and the same apparatus may be used for differently sized containers by, for example, providing deforming means both in the plunger described which operate covers a variable stroke according to the size of the container thus the containers may be of different lengths. Although there is described and shown containers in which the outlet from the container is in the base it will be appreciated that the outlet may be formed in the lid or closure member.

The arm 41, of the apparatus of FIGS. 1–5 and FIG. 6 is movable manually but the arm 41 may be powered in pivoting between the operating or dispensing position and the non-operating or location position. In this arrangement there may be a proximity switch which detects the location of a container in the seating 43 to initiate movement of the arm followed by a dispensing action when the container and arm reach the dispensing position. Alternatively the placing of a container in the seating is followed by manual action of a dispensing operation including an arm movement followed by a dispensing movement.

It has been described that in each embodiment of container the base and the lid are each nestable with other bases and lids respectively. Such nestability requires that nesting and denesting be achievable simply, by mechanical means, so that containers can be filled and assembled automatically by such machines. Thus there should be provided in each case shoulders, lugs or other means whereby the lids and bases do not become locked together.

In assembling the base and lid it is desirable to apply pressure to the deformable portion of the lid prior to uniting the lid and base at the edge thereof. This maintains the shape of the container and generates a small air pressure in any air in the lid. Alternatively or in addition a concave depression may be formed centrally of the domed portion of the lid as shown in FIG. 17.

I claim:

1. Dispensing apparatus for dispensing a viscous or semi-solid product from a container to a receiver, the container comprising a base, a deformable portion and an outlet, the apparatus comprising deforming means to engage and deform the deformable portion to extrude product from the container through the outlet for passage under gravity to the receiver located under the outlet, a seating for supporting the base of the container during dispensing of product from the container, a support carrying the seating, the support including an arm movable from an operating position to a non-operating position lying below and to one side of the operating position, and in which non-operating position the container may be removed from and placed on the seating, and pivot means for the arm about which the arm is movable between said positions, the deforming means being engageable with the container only in the operating position.

2. Dispensing apparatus according to claim 1 wherein the deforming means is a plunger movable in a generally vertical direction and the seating, in the operating position, is located vertically below the plunger, the arm and the seating being movable about a generally horizontal axis of the support means to a non-operating position to one side of the operating position.

3. Dispensing apparatus according to claim 2 wherein the seating and the arm are presented generally horizontally in the operating position and downwardly inclined to the horizontal in the non-operating position.

4. Dispensing apparatus according to claim 1 wherein the seating and the arm are releasably securable in each of the operating and non-operating positions and the plunger is movable only when the seating is in the operating position.

5. Dispensing apparatus according to claim 1 wherein the arm has a handle whereby the arm is movable manually between the operating and non-operating positions, and the seating is arranged for the container to be lifted up and out of the seating, the deformable portion of the container being presented upwardly towards the plunger and the outlet being presented downwardly from the arm when the container is located in the seating.

6. Dispensing apparatus according to claim 1 comprising an upright frame having towards its upper end a support for the deforming means and its associated drive means, the frame having intermediate its ends the arm and associated seating, and the frame having towards its lower end a base for supporting the frame, the base including a receiver spaced below the seating and giving access to a receptacle for product discharged from the container.

7. Dispensing apparatus according to claim 1 wherein the deforming means is driven by a compressed gas operated piston and cylinder arrangement, and the apparatus includes a source of compressed gas and gas reservoir for supplying pressurised gas to the piston and cylinder.

8. Dispensing apparatus according to claim 1 wherein the seating is a cup-shaped member arranged to receive a correspondingly-shaped base of the container, the seating having a central opening through which the container outlet is directed when the container is placed in the seating, the container being liftable out of the seating after a dispensing action, and the seating being removable from the arm.

9. Dispensing apparatus according to claim 1 wherein the deforming means is a plunger movable in a generally vertical direction, and the seating, in the operating position, is located vertically below the plunger, the arm and the seating being movable about a generally horizontal axis of said pivot means, said axis lying at or below the level of the seating, to a non-operating position, the seating and the arm being presented generally horizontally in the operating position and downwardly inclined to the horizontal in the non-operating position.

10. Dispensing apparatus for dispensing a viscous or semi-solid product from a container comprising a base, a deformable portion and an outlet, the apparatus comprising deforming means to engage and deform the deformable portion to discharge product from the container through the outlet, a seating for supporting the base of the container during dispensing of product from the container, an arm carrying the seating and moveable between an operating position and a non-operating position in which the container may be removed from and replaced in the seating, and support means for the arm whereby the arm is moveable between said positions, the deforming means being engageable with the container only in the operating position, the deforming means including locating means moveable to engage with the container to locate the container in the seating, and pressure generating means which engages with the deformable portion of the container to deform the portion towards the base in discharging product through the container outlet, the locating means comprising a locating member slidably mounted relative to the pressure generating means and resiliently urged by spring means towards a locating position, whereby after said member locates with the container the pressure generating means moves against the action of the spring means to deform the deformable portion of the container.

11. Dispensing apparatus according to claim 10 wherein the locating means and the pressure generating means are relatively movable so that, after the locating means has engaged the container, the pressure generating means moves relative to the locating means to discharge said product.

12. Dispensing apparatus according to claim 10 wherein the locating means comprises a locating member slidably mounted relative to the pressure generating means and resiliently urged by spring means towards a locating position, whereby after said member locates with the container the pressure generating means moves against the action of the spring means to deform the deformable portion of the container.

13. Dispensing apparatus according to claim 10 wherein the pressure generating means comprises a plunger head which is shaped to correspond with the internal shape of the base of the container.

14. Dispensing apparatus according to claim 13 wherein the plunger head is generally cylindrical with curvilinear surfaces at its region which engages the deformable portion of the container.

15. Dispensing apparatus for dispensing a viscous or semi-solid product from a container comprising a base, a deformable portion and an outlet, the apparatus comprising deforming means arranged to deform the container to discharge product from the container through the outlet, the deforming means including locating means moveable to engage with the container to locate the container and a plunger which engages with the deformable portion of the container to deform the portion towards the base in discharging product through said outlet, the locating means and the plunger being relatively moveable so that, after the locating means has engaged the container, the plunger moves relative to the locating means to discharge said product, the locating means comprising a locating member slidably mounted relative to the plunger and resiliently urged by spring means towards a locating position, whereby after said locating member locates the container, the plunger moves against the action of the spring means to deform the deformable portion of the container.

16. A container for use in dispensing apparatus comprising a base for receiving product to be dispensed, an outlet opening for discharge of product, a deformable member associated with the base, a region of the deformable member arranged to deform upon engagement by deforming means of the apparatus and to be moved towards the base to extrude product from said outlet, the base having a junction between upper and lower parts of the base arranged so that said region of the deformable member extends into the upper part of the base and, upon deformation of said region, said region enters and moves adjacent internal surfaces of the lower part of the base, and at said junction between said upper and lower parts of the base there is an outwardly directed shoulder, and said region has an outer part which extends towards said shoulder, the deformable member having said region inwardly of said outer part so that, in use, said region is engaged and deformed by said deforming means towards said lower region of the base.

17. A container according to claim 16 wherein said lower region of the base is generally circular in cross section with a radiused portion and a generally flat lower surface, the lower surface being formed with said outlet.

18. A container according to claim 16 wherein the deformable region is generally dome shaped extending to the opposite side of said junction to the base and being deformable past said junction towards the internal surface of the base.

* * * * *